Jan. 17, 1956    D. J. WALLACE ET AL    2,731,336
METHOD OF MAKING FORM DRESSING TOOL
Filed April 4, 1952    2 Sheets-Sheet 1
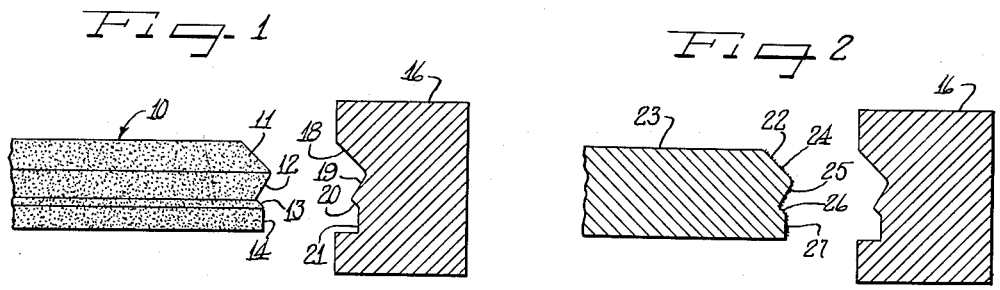
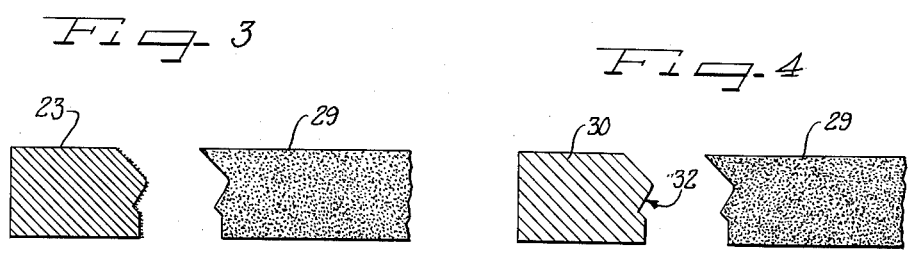
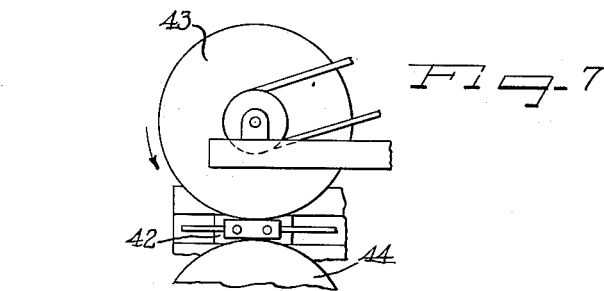
Inventors
Donald J. Wallace
Leo Catallo
by Hill, Sherman, Meroni, Gross & Simpson Attys Jan. 17, 1956  D. J. WALLACE ET AL  2,731,336
METHOD OF MAKING FORM DRESSING TOOL
Filed April 4, 1952  2 Sheets-Sheet 2
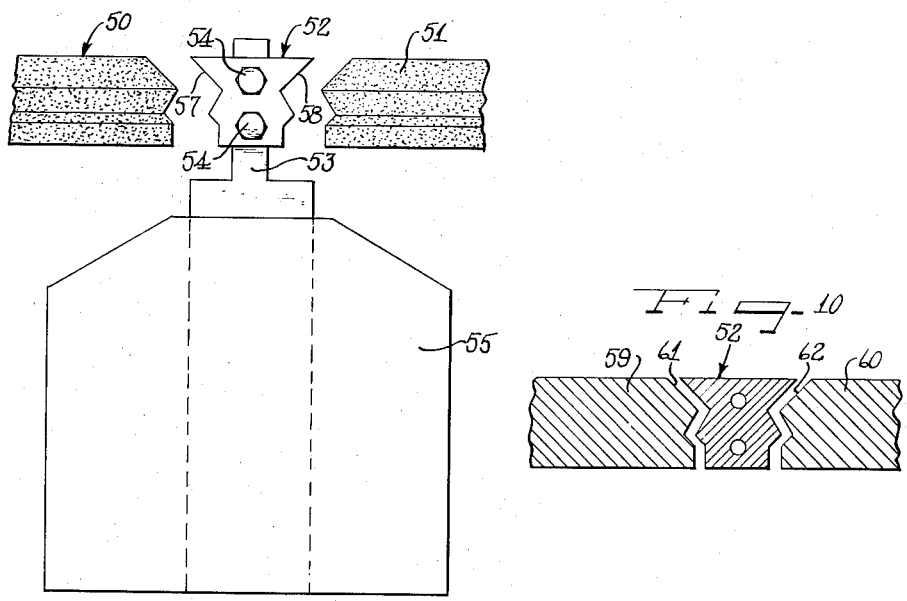
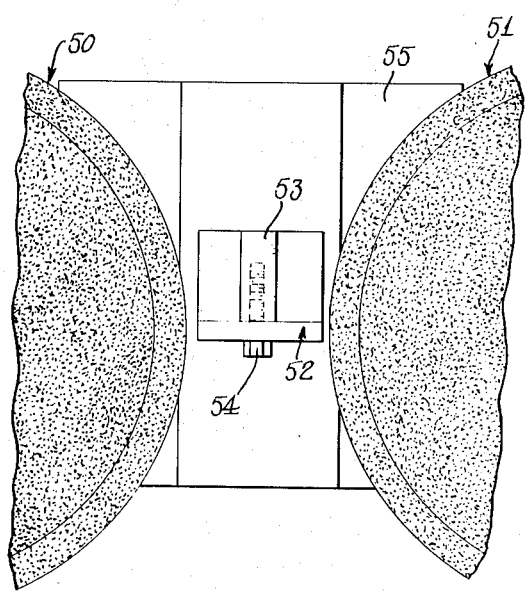
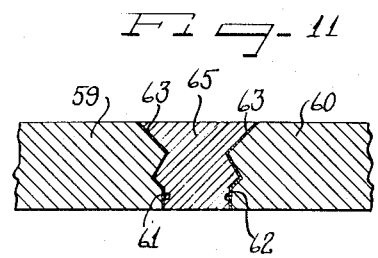
Donald J. Wallace
Leo Catallo United States Patent Office 2,731,336
Patented Jan. 17, 1956

2,731,336

METHOD OF MAKING FORM DRESSING TOOL

Donald J. Wallace and Leo Catallo, Detroit, Mich., assignors to Wheel Trueing Tool Company, Detroit, Mich., a corporation of Delaware Application April 4, 1952, Serial No. 280,464

5 Claims. (Cl. 51—309)

The present invention relates to form dressing tools used for shaping or contouring the working peripheral surfaces of grinding wheels and the like to provide them with accurately defined contoured surfaces. The present invention also relates to a method for manufacturing such form dressing tools.

An object of the present invention is to provide an improved form dressing tool consisting of a hard metal matrix and a form dressing surface including discrete finely divided abrasive particles embedded in the matrix.

Another object of the present invention is to provide a method for manufacturing form dressing tools of predetermined surface contour in a rapid and economical manner.

Still another object of the present invention is to provide an improved method for the manufacture of form dressing tools to within close dimensional tolerances.

Other objects and features of the present invention will be apparent to those skilled in the art from the following description of the attached sheets of drawings which illustrate the steps involved in the manufacture of the form dressing tools of the present invention.

In the drawings:

Figure 1 is a fragmentary plan view of the first step of the process in which a first mold is formed by means of a grinding wheel having the desired profile;

Figure 2 is a fragmentary plan view illustrating the first form dressing tool produced from the mold of Figure 1;

Figure 3 is a fragmentary plan view illustrating how the form dressing tool produced in Figure 2 is used to dress the periphery of another grinding wheel;

Figure 4 is a fragmentary plan view illustrating the manner in which a second mold is made from the grinding wheel of Figure 3;

Figure 5 illustrates the manner in which the final form dressing tool is produced in the mold of Figure 4;

Figure 6 is a perspective view of two form dressing elements produced by the method of the present invention joined together to form a two-surfaced form dressing tool;

Figure 7 is a fragmentary view in elevation of a form dressing assembly illustrating the manner in which the tool of Figure 6 is employed to form dress an abrasive wheel;

Figure 8 is a front view of a modified form of the present invention where a hard metal blade is shaped by grinding and subsequently used to carve out molds for producing the finished tool;

Figure 9 is a top view of the assembly shown in Figure 8;

Figure 10 is a fragmentary view illustrating the manner in which the contoured blade shapes the molding surfaces; and Figure 11 is a fragmentary view illustrating the two molding blocks in the process of molding the finished tool.

As shown on the drawings:

Reference numeral 10 indicates a grinding wheel having a contoured periphery which is to be reproduced in other grinding wheels. For purposes of illustration, the grinding wheel 10 is shown as including a relatively long angular surface 11, an inwardly inclined angular surface 12, an outwardly inclined angular surface 13, and a relatively flat edge portion 14. The proper contour can be provided in the periphery of the wheel 10 initially by properly cutting the surface of the abrasive wheel with a single diamond point. However, if this method of form dressing were employed to form dress all grinding wheels having the same contour, the form dressing operation would become very time consuming and expensive. In order to avoid this time consuming and expensive operation, the initially preformed grinding wheel 10 is used in the manufacture of refractory molds from which form dressing elements can be conveniently fabricated.

The next step in the process consists in reproducing a contour complementary to that of the grinding wheel 10 in a refractory mold. For this purpose, a block of refractory material such as a block of graphite 16 is provided. The grinding wheel 10 is rotated at a sufficiently high velocity on its axis of rotation and the graphite block 16 is advanced into contact with and moved tangentially relative to the contoured periphery of the wheel 10, so that eventually the graphite block 16 is cut to the proper shape. As seen in Figure 1, after the graphite block 16 has been cut by means of the preformed grinding wheel 10, the graphite block 16 has a contour the reverse of the contour of the grinding wheel 10. The recessed portion of the block 16 includes a relatively long angular surface 18 corresponding to the surface 11 of the grinding wheel, a surface 19 corresponding to surface 12 of the grinding wheel, a surface 20 corresponding to surface 13 of the grinding wheel, and a relatively flat surface 21 corresponding with the relatively flat edge portion 14 of the grinding wheel 10.

After the graphite block 16 is cut to the proper depth it is employed as a mold for the fabrication of an intermediate form dressing tool. For this purpose, the recessed graphite block 16 is inserted into a suitable molding die. Finely divided, discrete abrasive particles such as diamond particles 22 are then distributed over the recessed surfaces of the graphite block 16, after which a powdered metal matrix is distributed over the relatively thin layer of diamond particles. The size of the particles for most applications will be from 50 to 500 particles per carat, and a preferred size is on the order of 400 particles per carat. While many different types of metallic matrices may be employed for the manufacture of the tool, we prefer to use finely divided tungsten or a mixture of tungsten and tungsten carbide particles for the matrix. After the powdered metal matrix is distributed over the abrasive diamond particle layer, pressure is applied to the powdery mixture, and the temperature is raised sufficiently to cause sintering of the matrix particles. Suitable temperatures are on the order of 1800° F. to 2100° F. but not over 2200° F. To avoid oxidation of the particles during sintering and compression, the sintering operation is preferably carried out in the atmosphere of a non-oxidizing gas such as hydrogen or carbon monoxide.

The resulting diamond surfaced tool 23 when removed from the graphite mold 16 has a contour substantially identical with the contour of the preshaped grinding wheel 10 of Figure 1. This contour includes a relatively long angular surface 24, an inwardly inclined surface 25, a relatively short outwardly inclined surface 26, and a relatively flat edge portion 27.

The next step in the process consists in form dressing a second grinding wheel with the diamond tool 23 produced in the previous step. For form dressing a grinding wheel 29 illustrated in Figure 3, the wheel 29 is rotated about its axis while the abrasive surface of the diamond tool 23 is brought into abrading contact with and moved tangentially of the periphery of the wheel. For an assembly suitable for the form dressing of a grinding wheel of this type, reference is made to our copending application, Serial No. 277,562, filed March 20, 1952. After the form dressing operation, the periphery of the second grinding wheel 29 assumes a shape complementary to that possessed by the abrasive surface of the diamond tool 23.

In the next step, illustrated in Figure 4, the wheel 29, after having been shaped by the diamond tool 23, is employed to cut a second graphite block 30 and thereby provide a mold cavity for the production of the finished form dressing tool. As seen in Figure 4, the molding surface 32 of the resulting recessed graphite block 30 is identical in contour with the intermediate diamond tool 23 as well as the original grinding wheel 10. The final diamond tool 40 is prepared from a pair of the resulting recessed graphite blocks 30 in the same manner in which the intermediate diamond tool 23 was manufactured. A pair of the blocks 30 are received within a die in spaced relation, and a layer of finely divided diamond particles 31 is distributed over the molding surfaces 32 of the blocks 30 while the latter are supported within the molding die. A particulated mixture of tungsten and tungsten carbide or tungsten alone is then introduced over the discrete diamond particle surfaces, and the entire mass subjected to compression and sintering at appropriate temperatures to form a coherent, rigid tool including a matrix of compacted, sintered particles having finely divided diamond particles embedded in the surface thereof.

The finished form dressing tool is illustrated in Figure 6. The tool includes a relatively hard matrix and contoured dressing surfaces containing discrete diamond particles 31 and 39, respectively, embedded in the matrix.

The final graphite mold blocks 30 can be reused in the production of additional form dressing elements.

A more simplified manner for performing the method of the present invention is illustrated in Figures 8 and 9 of the drawings. In this form of the invention, a pair of similarly contoured dressing wheels 50 and 51 is provided, the wheels 50 and 51 being rotatable on spaced axes of rotation, and movable toward and away from each other. A hard steel blade 52 is secured to a supporting shank 53 by means of bolts 54. The shank 53 is tightly received within a carrying block 55.

The wheels 50 and 51 are positioned so that their contoured peripheries engage the opposed surfaces 57 and 58 of the blade 52 to cut these surfaces into a contour which is the reverse of that of the peripheries of the grinding wheels 50 and 51. The contoured blade 52 is then used to cut the surfaces of a pair of elongated graphite blocks 59 and 60 (Figure 10) into a pair of molding surfaces whose contours are the same as those of the wheels 50 and 51 originally used to cut the surfaces 57 and 58. The resulting molding blocks 59 and 60 are supported in the molding die in spaced relation, and a layer of diamond particles 63 (Figure 11) is applied with a suitable binder, to the molding faces 61 and 62 of the blocks 59 and 60. Subsequently, a mixture 65 is introduced into the molding cavity between the blocks 59 and 60 consisting of powdered tungsten or a mixture of tungsten and tungsten carbide. The mass is sintered at temperatures of 1800° F. to 2100° F. to produce a rigid compact, identical with that shown in Figure 6.

The tool illustrated in Figure 6 can be used for the dressing of two abrasive wheels simultaneously as illustrated in Figure 7. The tool 40 is mounted on a reciprocable carriage 42 between the peripheries of a pair of vertically spaced grinding wheels 43 and 44. The wheels are rotated in opposite angular directions while the tool 40 is reciprocated in abrading contact with the peripheries of the wheels 43 and 44. The pressure of the wheels 43 and 44 against the tool 40 is adjusted so that the tool 40 abrades the peripheries of the wheels without substantially crushing the resinous matrix of the abrasive wheels. A few passes of the tool 40 between the wheels is usually sufficient to dress the surface of the wheels accurately to the desired contour.

From the foregoing, it will be appreciated that the method of the present invention provides a convenient means for accurately reproducing a desired contour on a plurality of grinding wheels. The resulting form dressing tools can be made to conform with very close dimensional tolerances and can be rapidly and economically produced.

It will be understood that modifications and variations may be effected without departing from the scope of the novel concepts of the present invention.

We claim as our invention:

1. The method of making a form dressing tool which comprises providing a grinding wheel having a peripheral contour to be reproduced on other grinding wheels, grinding a mold-making material with said grinding wheel to form a first mold having a reverse contour to that of said wheel, molding a first abrasive surfaced tool with said first mold thus produced, form dressing the surface of a second grinding wheel with the first tool thus produced from said first mold, cutting a second mold-making material with said second grinding wheel to form a second mold having a reverse contour to that of said second wheel, and molding a final abrasive-surfaced cutting tool within the resulting mold cavity of said second mold.

2. The method of making a form dressing tool which comprises providing a grinding wheel having a peripheral contour to be reproduced on other grinding wheels, cutting a first graphite block with said grinding wheel to form a first mold having a reverse contour to that of said grinding wheel, molding a first abrasive surfaced cutting tool with said first mold thus produced, form dressing the surface of a second grinding wheel with said first tool thus produced from said first mold, cutting a second graphite block with the thus second dressed grinding wheel to form a second mold having a reverse contour to that of said second wheel, and molding a final abrasive surfaced cutting tool within the resulting mold cavity of said second mold.

3. The method of making a form dressing tool which comprises providing a grinding wheel having a peripheral contour to be reproduced on other grinding wheels, cutting a first graphite block with said grinding wheel to form a first mold having a recessed molding cavity having a reverse contour to that of said wheel, distributing abrasive particles on said grinding molding cavity, distributing a powdered metal matrix over said abrasive particles, compressing and sintering said powdered metal matrix to form a first sintered form dressing tool with said abrasive particles embedded in the surface of said tool, form dressing a second grinding wheel with said first form dressing tool thus produced from said mold, cutting a second graphite block with the thus dressed grinding wheel to form a second mold cavity in said second graphite block having a reverse contour to that of said second grinding wheel, distributing abrasive particles along said second mold cavity, distributing a powdered metal matrix over said abrasive particles in said second mold cavity, and compressing and sintering said matrix to produce a final sintered form dressing tool having abrasive particles embedded in the surface thereof.

4. The method of making a form dressing tool and form dressing a grinding wheel which comprises providing a grinding wheel having a peripheral contour to be reproduced on other grinding wheels, grinding a relatively hard metal cutting element with said wheel to form a cutting tool having a reversed contour to that of said wheel, cutting a mold making material with said cutting tool to provide a mold having a contour of said grinding wheel, molding an abrading-surfaced form dressing tool with the resulting mold cut with said cutting tool, and abrading a surface of a grinding wheel with the form dressing tool to provide the grinding wheel with a peripheral contour substantially identical to that of the first-mentioned grinding wheel.

5. The method of making a form dressing tool for dressing grinding wheels which comprises grinding a relatively rigid blade to provide a surface thereon having a contour the reverse of that to be reproduced on a grinding wheel, cutting with said blade a block of material suitable for use as a mold to provide on said block a molding surface having a contour the reverse of that of said blade, applying to said molding surface a layer of abrasive particles admixed with a binder therefor, backing said layer with a mass of metallic particles and molding said mass and layer together under heat and pressure against said molding surface to form an abrasive surfaced form dressing tool having a contour the reverse of said molding surface and the reverse of that to be reproduced on a grinding wheel.

References Cited in the file of this patent

UNITED STATES PATENTS

| Number | Name | Date |
|---|---|---|
| 151,847 | Cochran | June 9, 1874 |
| 162,343 | Blaisdell | Apr. 20, 1875 |
| 353,415 | Drake | Nov. 30, 1886 |
| 1,020,297 | MacFarland | Mar. 12, 1912 |
| 1,401,577 | Becker | Dec. 27, 1921 |
| 1,480,644 | Vogan | Jan. 15, 1924 |
| 1,979,536 | Edgar | Nov. 6, 1934 |
| 2,014,955 | Taylor | Sept. 17, 1935 |
| 2,048,222 | Rehmann | July 21, 1936 |
| 2,182,562 | Koehel | Dec. 5, 1939 |
| 2,210,039 | Petrie | Aug. 6, 1940 |
| 2,224,595 | Dawihl | Dec. 19, 1940 |
| 2,226,608 | Gilmore | Dec. 31, 1940 |
| 2,238,785 | Walton | Apr. 15, 1941 |
| 2,281,420 | Drader | Apr. 28, 1942 |
| 2,311,756 | Jackson | Feb. 23, 1943 |
| 2,404,184 | Ludel | July 16, 1946 |
| 2,435,916 | Windsor | Feb. 10, 1948 |
| 2,523,698 | Hawley | Sept. 26, 1950 |
| 2,582,231 | Catallo | Jan. 15, 1952 |
| 2,586,673 | Linxweiler | Feb. 19, 1952 |
| 2,586,755 | Wilson | Feb. 19, 1952 |